Dec. 8, 1964    J. R. MALLOY ETAL    3,160,047
ROLL FILM DISPENSER
Filed Nov. 21, 1960    9 Sheets-Sheet 1

INVENTORS
JOHN R. MALLOY
THEODORE HOMMEL

BY Cushman, Darby & Cushman

ATTORNEYS

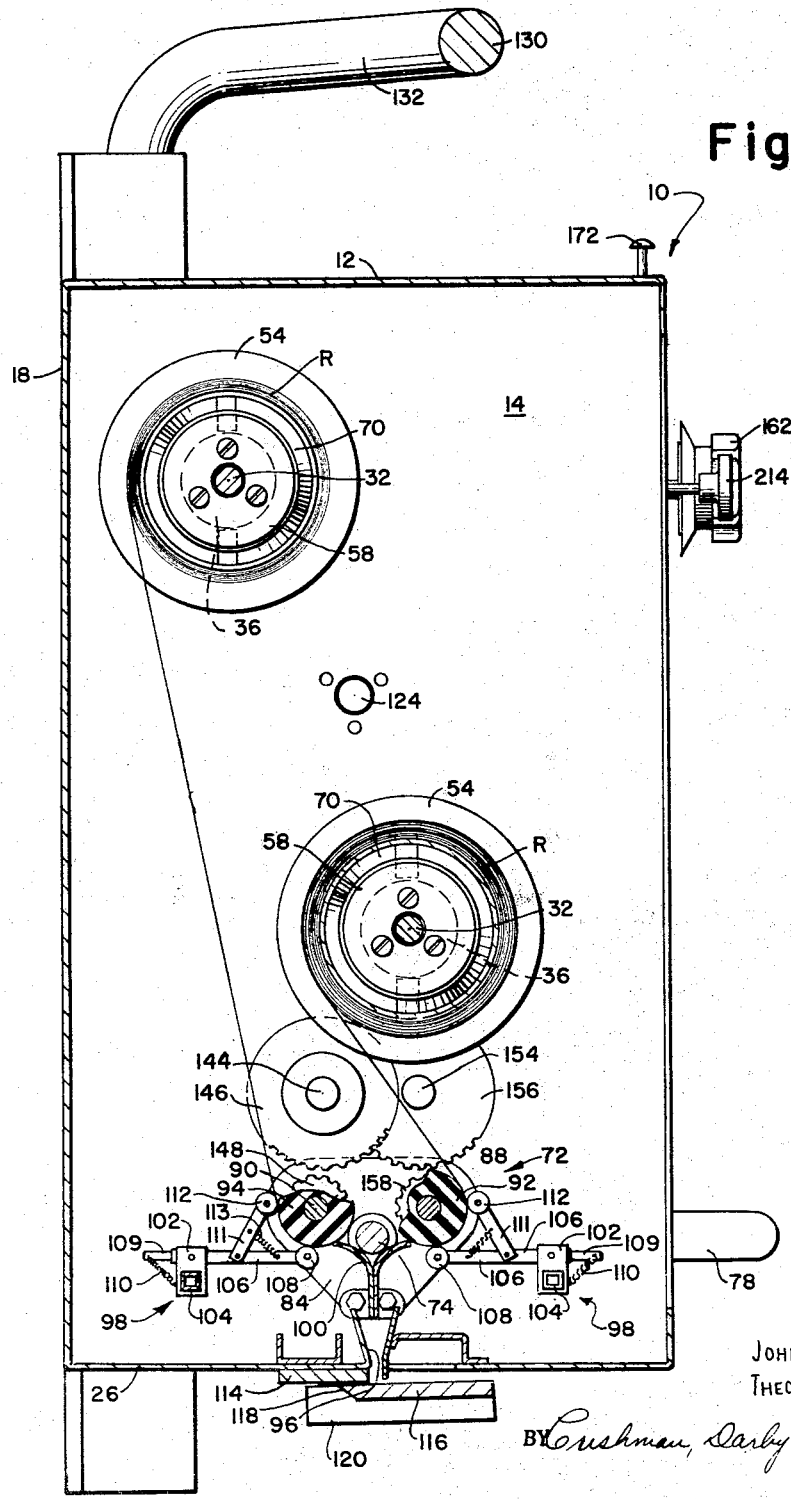

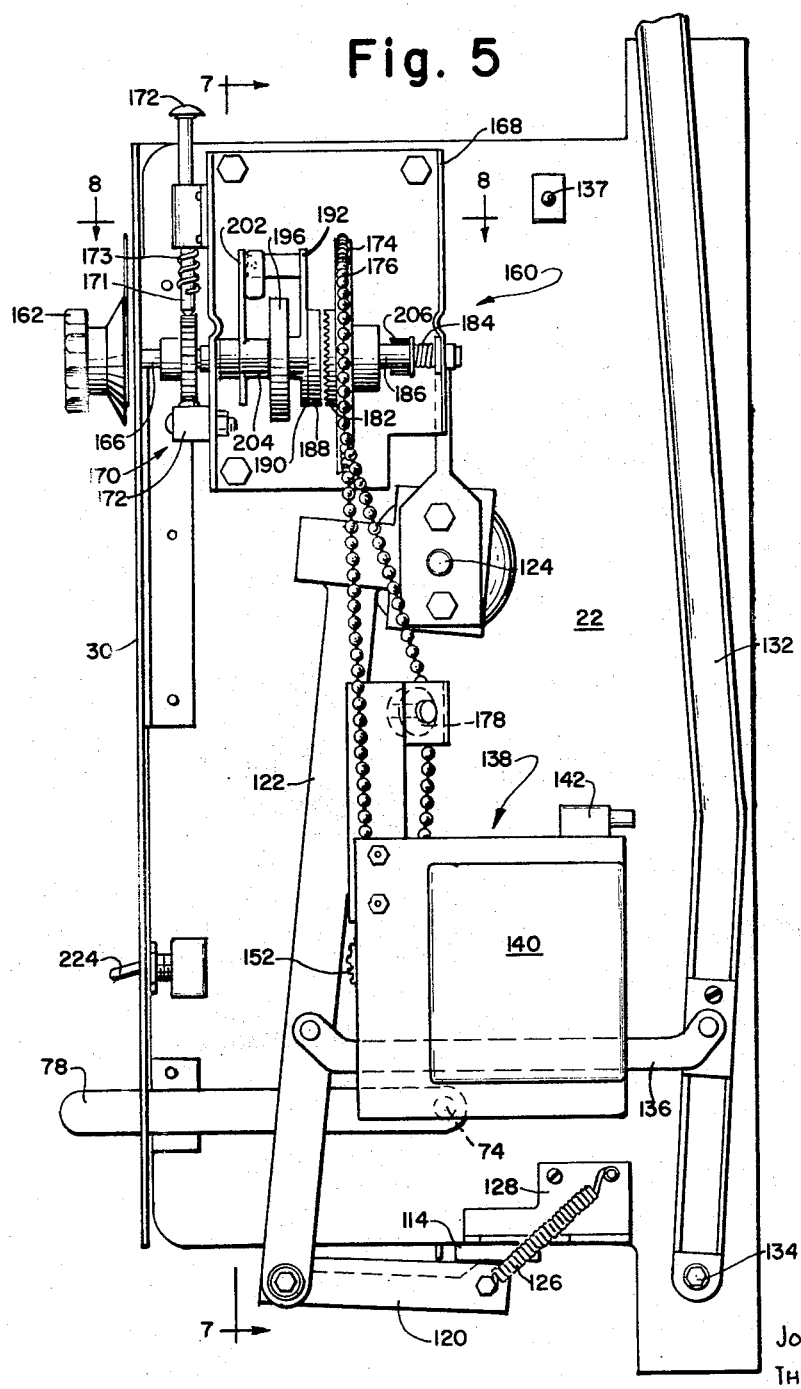

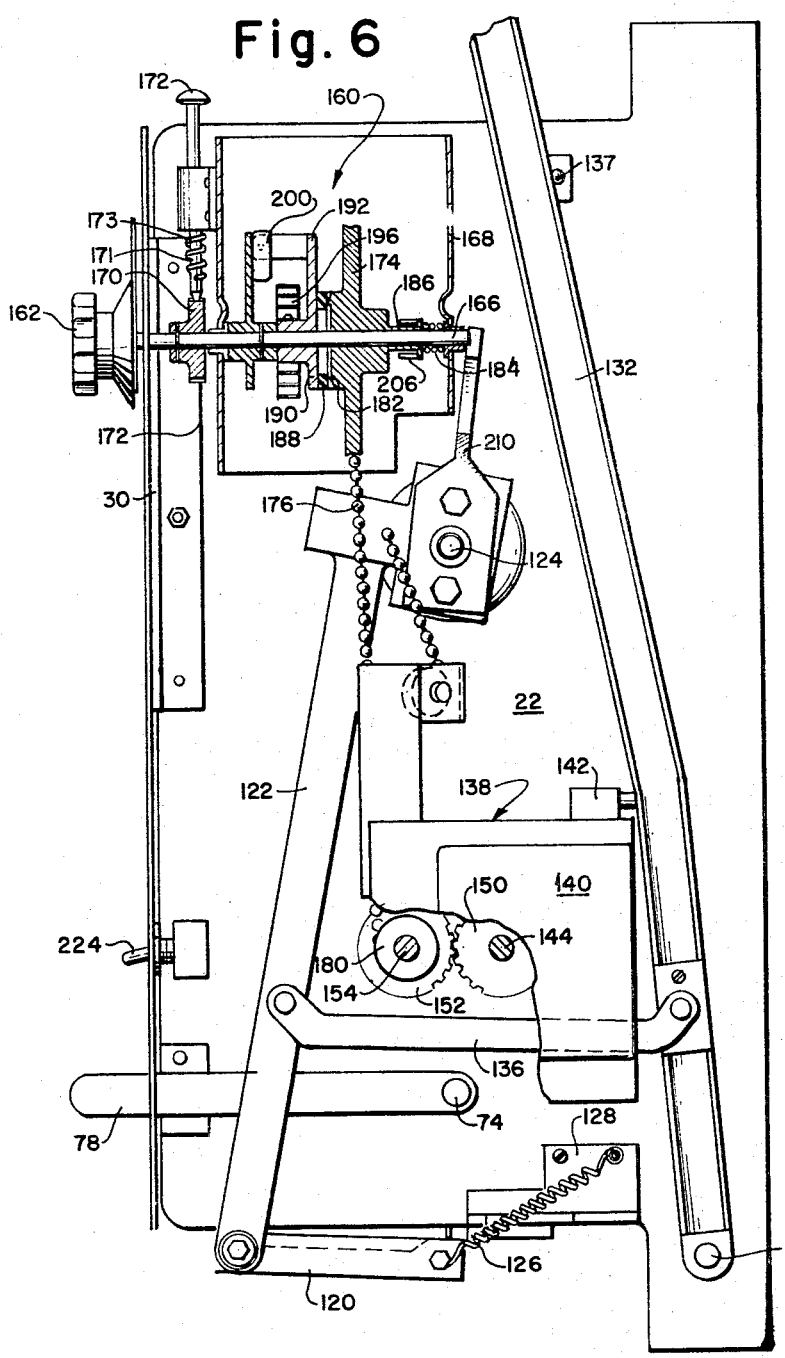

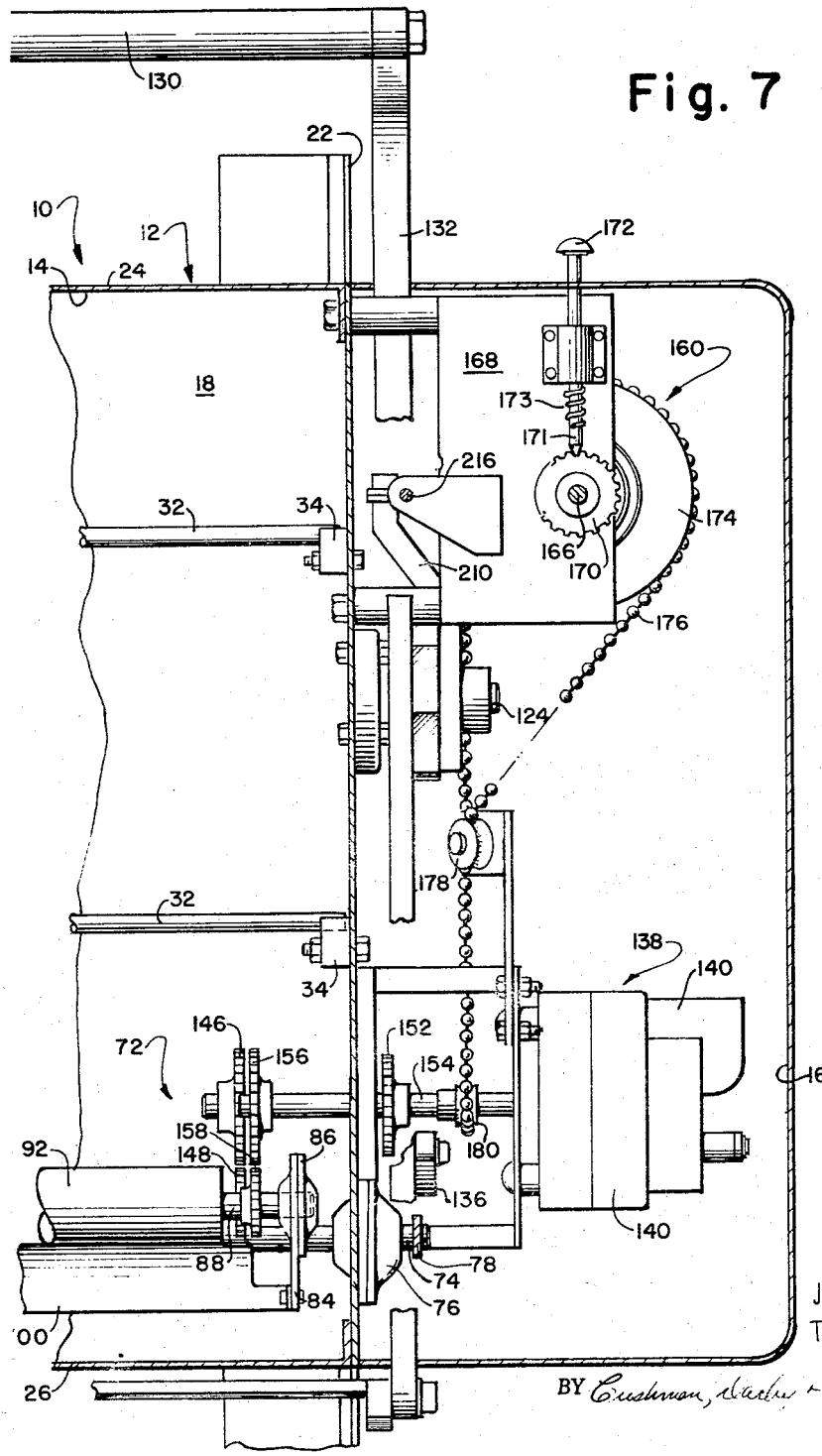

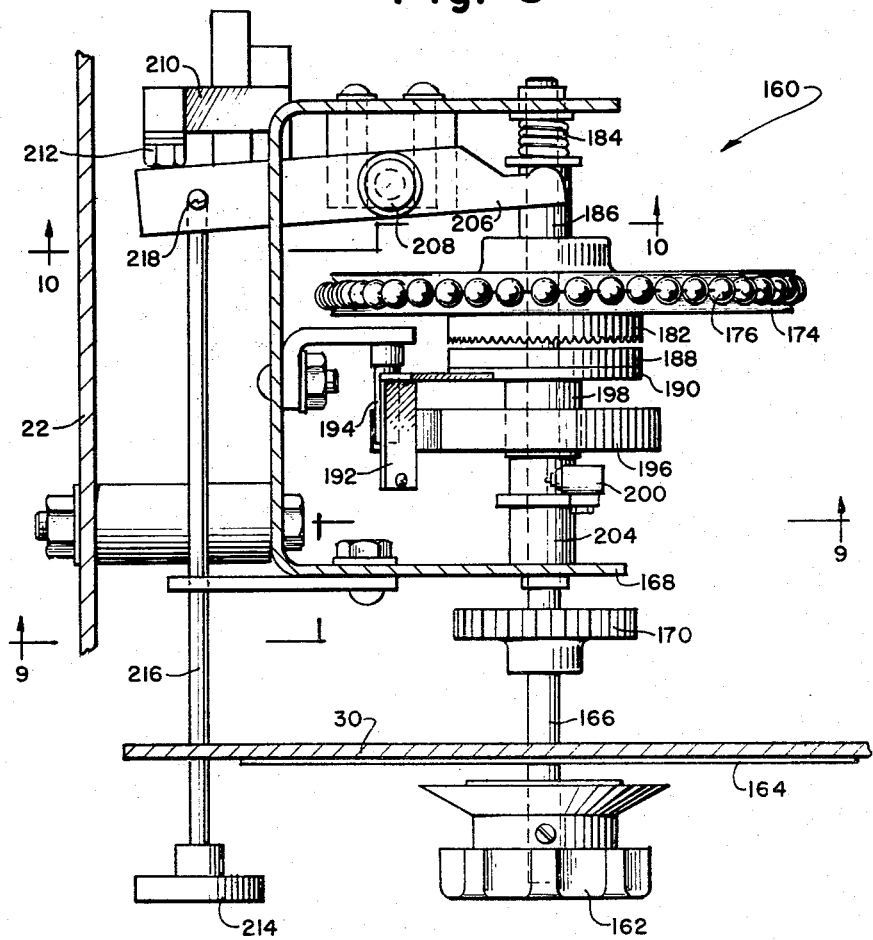

Dec. 8, 1964  J. R. MALLOY ETAL  3,160,047
ROLL FILM DISPENSER
Filed Nov. 21, 1960  9 Sheets-Sheet 9

INVENTORS
JOHN R. MALLOY
THEODORE HOMMEL
BY Cushman, Darby & Cushman
ATTORNEYS 3,160,047
ROLL FILM DISPENSER
John R. Malloy, Delaware County, and Theodore Hommel, Chester County, Pa., assignors to Lanston Industries, Incorporated, Philadelphia, Pa., a corporation of Virginia
Filed Nov. 21, 1960, Ser. No. 89,592
(Filed under Rule 47(a) and 35 U.S.C. 116)
17 Claims. (Cl. 83—208)

This invention relates to article handling and more particularly to apparatus for handling continuous rolls of film and for cutting from such rolls desired predetermined lengths.

The handling of film in the graphic arts industry presents problems of handling, storage, spoilage and inventory. These problems to a large extent result from the practice of utilizing precut film sheets. While precut film is simple to handle, the use thereof presents serious problems of storage and inventory. That is, a user must stock all the various sizes for which he might have use. While sheets of film can be reduced in size by suitable trimming, this practice results in considerable waste. Moreover, sheet stock is more expensive than roll stock and must be retained in individual packages for each size in order to prevent accidental exposure.

Film maintained in roll formation is available and is generally less costly than cut sheets since it does not require the cutting labor at the factory nor the individual packaging problem that sheet film does. Moreover, roll film is easier to store and requires fewer sizes in stock. Nevertheless, the handling of film in roll formation presents serious problems, particularly from the standpoint of preventing contamination and/or exposure of the emulsion side of the film during the cutting of the roll into desired lengths.

An object of the present invention is the provision of an apparatus for handling film in roll formation and for dispensing and cutting desired lengths from such roll formation without the necessity of manual handling of the film during such dispensing and cutting operation.

Another object of the present invention is the provision of an apparatus of the type described having improved film guiding roller means for directing film from a roll into a position to be cut without contacting the emulsion side of the film except along the marginal edges thereof in a minimal manner.

Still another object of the present invention is the provision of an apparatus of the type described which is automatically operable to measure and cut a desired length of film from a roll of film.

Another object of the present invention is the provision of an apparatus of the type described having means for maintaining a plurality of rolls of film of different widths therein for selectively measuring and cutting predetermined lengths from any one of the plurality of rolls.

Still another object of the present invention is the provision of an apparatus of the type described having improved film dispensing means operable to automatically dispense a desired selected length of film from any one of a plurality of rolls of various widths.

Still another object of the present invention is the provision of an apparatus of the type described having a cutting blade normally maintained in light-excluding relation with respect to a film roll retaining chamber and movable from such position into a cutting position by movement of an actuating handle for the apparatus.

Still another object of the present invention is the provision of apparatus having a cutting blade and actuating handle of the type described including means for automatically operating a film dispensing mechanism for feeding a selected desired length of film in response to the movement of said actuating handle.

Still another object of the present invention is the provision of apparatus having an actuating handle, film roll dispensing mechanism and cutter blade of the type described having resilient means for actuating the blade into cutting relation to the dispensed film in response to the release of the actuating handle.

Still another object of the present invention is the provision of an apparatus having an actuating handle, a film roll dispensing mechanism and cutter blade of the type described having means for resetting and reactuating the dispensing mechanism to obtain desired multiples of the selected length to be cut prior to the release of the actuating lever.

Still another object of the present invention is the provision of apparatus of the type described which is simple in construction, efficient in operation and economical to manufacture and maintain.

These and other objects of the present invention will become more apparent during the course of the following detailed description and appended claims.

The invention may best be understood with reference to the accompanying drawings, wherein an illustrative embodiment is shown.

In the drawings:

FIGURE 2 is a cross-sectional view taken along the line 2—2 of FIGURE 1;

FIGURE 5 is a side elevational view looking toward the right hand side of the apparatus with the end cover removed, the parts being shown in their inoperative position;

FIGURE 6 is a view similar to FIGURE 5 showing the parts in their operative position;

FIGURE 7 is a fragmentary cross-sectional view taken along the line 7—7 of FIGURE 5;

FIGURE 8 is an enlarged fragmentary sectional view taken along the line 8—8 of FIGURE 5, showing the parts in their inoperative position;

Figure 1:
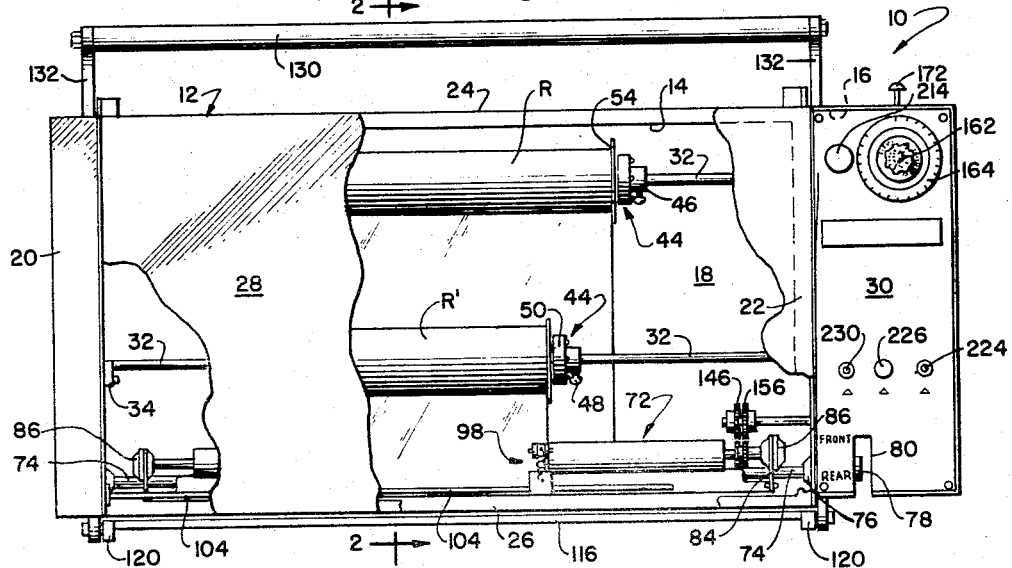
FIGURE 1 is a front elevational view, with certain parts broken away, of an apparatus embodying the principles of the present invention.

Referring now more particularly to the drawings, there is shown therein an apparatus 10 which embodies the principles of the present invention. The apparatus includes a housing 12 which may be of any suitable construction. For example, as shown, the housing is made up of a skeletonized frame having sheet metal panels covering the same so as to form a rectangular box-like structure which provides a main film containing chamber 14 and an actuating mechanism chamber or compartment 16 adjacent one side thereof. Preferably, the film chamber 14 is constructed so as to be substantially light-free so that unexposed film can be mounted therein without danger of exposure. It will be noted that the chamber 14 includes a back panel 18, a left-hand side panel 20, a right-hand side panel 22, a top panel 24, a bottom panel 26 and a removable front cover panel 28. The mechanism compartment 16 is provided with similar panels including a front instrument panel 30.

The film chamber 14 is arranged so as to have suitably mounted therein a plurality of film rolls, indicated at R and R'. Preferably, the arrangement is such that film rolls of different widths may be readily accommodated. To this end, each of the rolls R is preferably mounted in the chamber 14 by means of a shaft 32 which extends between the side panels 20 and 22 and has its ends disposed in supporting relation to a pair of upwardly open V-shaped supporting brackets 34. As shown, the roll of film R is of a greater width than the roll R' and its shaft 32 is disposed in the upper rearward portion of the chamber 14 while the shaft 32 for the narrow roll R' is disposed in the forward central portion of the chamber.

Figure 3:
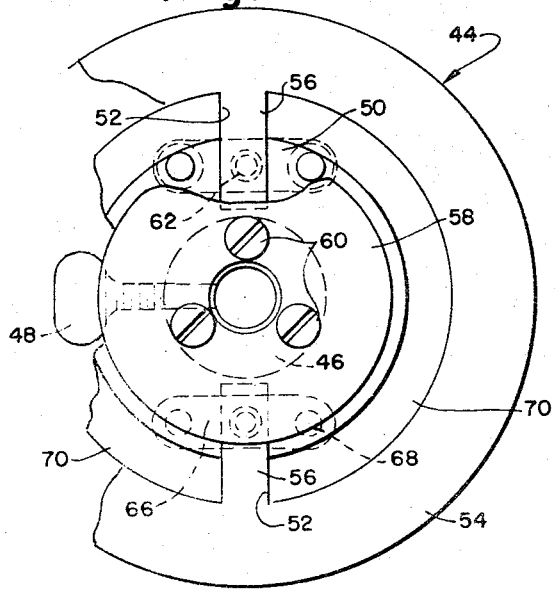
FIGURE 3 is a front elevational view, with parts broken away, of one of the roll film mounting flange assemblies.
Figure 4:
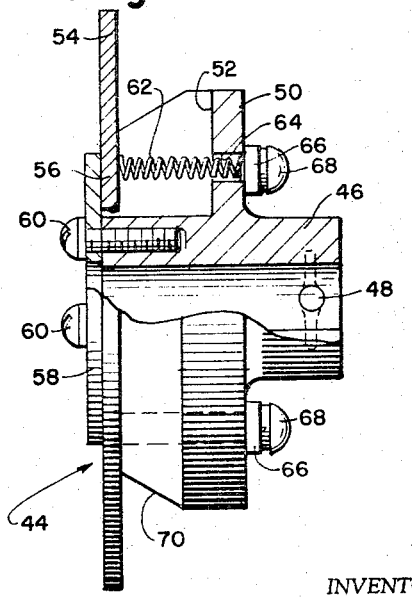
FIGURE 4 is a side elevational view, partly in section, of the structure shown in FIGURE 3.

Each roll of film is mounted on the associated shaft 32 by means of a pair of film mounting flange assemblies, generally indicated at 44, which are best shown in FIGURES 3 and 4. Each assembly includes a central hub member 46 which slidably receives the associated shaft and is provided with a thumb screw 48 for fixing the hub portion in longitudinally adjusted relation along the shaft. Each hub portion includes a thickened flange portion 50 extending radially outwardly from the inner end portion thereof, each flange portion having formed therein a pair of diametrically opposed radially extending slots 52. The end of the roll of film is arranged to be engaged by a flat ring 54 having diametrically opposed radially inwardly extending projections or tabs 56 arranged to engage within the slots 52. Inward movement of the rings 54 is limited by means of a stop disc 58 suitably fixed to the inner end of the associated hub portion 46 as by bolts 60. It will be seen that the inner surfaces of the projecting tabs 56 will engage the adjacent outer surface of the stop disc and the flat ring is resiliently urged into such position by means of a coil spring 62 having one end engaged with the associated tab 56 and the opposite end thereof extending through an opening 64 formed in the adjacent portion of the flange 50 and engaging a bar 66 secured across the opening 64 by any suitable means, such as a pair of bolts 68 or the like.

It can be seen that by the use of a pair of opposed flange assemblies 44 a film roll of any selected width can be readily accommodated merely by loosening the associated thumb screws 48 and properly positioning the flange assemblies on the shaft. Desirably, the hub portions 46 are moved inwardly with respect to the roll until an inner frusto-conical surface 70 of the hub portion engages within the usual cardboard roll holder cylinder. In this position the flat rings 54 will be depressed and thus resiliently engage the edges of the film to insure proper alignment.

The film from the rolls R and R' is fed over a feed dispensing roller assembly, generally indicated at 72, which is arranged to be selectively manually actuated into either one of two operative positions depending upon the film roll from which a length of film is desired. As best shown in FIGURES 1, 5, 6, and 7, the roller assembly 72 comprises a main shaft 74 which has its ends journaled in the side panels 20 and 22 by any suitable means such as spherical self-aligning bearings 76. The right hand end of the shaft 74 extends into the control compartment 16 and has a manual lever 78 fixed thereto, the lever extending forwardly through an appropriate slot 80 in the control panel 30 so that by moving the extended end of the lever up and down, the shaft 74 can be pivoted about its axis. Preferably, the portion of the housing adjacent one side of the lever is slotted or otherwise provided with abutment means which serve to positively retain the lever in either of its operative positions. With this arrangement, it is necessary to first flex the lever laterally out of engagement with the abutment means at each position in order to move the lever into the opposite position.

Mounted on the shaft 74 in inwardly spaced relation with respect to the side panels of the housing and in fixed relation to the shaft is a pair of plates 84, each having a pair of horizontally spaced bearings 86 mounted therein. The bearings 86 may be of any suitable construction and, as shown, are of the spherical self-aligning type similar to the bearings 76. Extending between and journaled in the pairs of aligned bearings 86 is a pair of shafts 88 and 90 having rollers 92 and 94 respectively fixed to the central portion thereof. The rollers 92 and 94 are preferably made of a frictional material suitable to cause the film to pay out from the roll upon contact therewith during rotation, such as rubber or the like.

As best shown in FIGURE 2, the film from the roll R extends therefrom and is fed around the roller 94, and through a slot 96 formed in the bottom panel 26 of the housing. In a like manner, the film from the roll R' is fed around the roller 92 and through the slot 96. The film from each roll is maintained in contact with the associated roller by means of a pair of longitudinally adjustable spring pressed idler roller assemblies 98 and a pair of elongated arcuate plates 100 are fixedly mounted between the mounting plates 84 in positions to insure that the film will be properly directed to the slot and not enter the space between the roller and shaft 74 or otherwise become misdirected.

Each idler roller assembly 98 comprises a mounting bracket 102 adjustably slidably mounted on a longitudinally extending rail 104 mounted in fixed position between the side panels 20 and 22, there being a rail associated with each of the rollers 92 and 94. Pivotally mounted on each mounting bracket intermediate its ends is a lever 106, one end of which has an idler roller 108 rotatably mounted thereon and the other end of which has a pin 109 extending therefrom. A coil spring 110 extends between each pin 109 and the associated bracket 102 so as to resiliently urge the idler roller 108 therein into film pressing engagement with the associated dispensing roller. A second arm 111 has one end thereof pivoted to each lever 106 between its pivot and the roller 108 and an idler roller 112 journaled on the opposite end thereof. A coil spring 113 is connected between each arm 111 and lever so as to resiliently urge the rollers thereon toward each other.

Each idler roller assembly 98 is adjusted longitudinally by manually punching the pin 109 and roller 112 together, thus pivoting both idler rollers out of contact with the film on the associated dispensing roller so that the assembly may be easily moved along the rail. When released, the engagement of the idler rollers with the film is sufficient to prevent longitudinal movement of the assemblies. Preferably, the pair of idler roller assemblies 98 associated with each dispensing roller is adjusted longitudinally, in operation, to engage the marginal edges of the film contacting the respective dispensing roller. In this way, one side of the film is engaged at its marginal edges only, such side preferably constituting the emulsion side of the film, thus minimizing the danger of damage thereto. Rolls R and R', as shown in FIGURE 2, are wound emulsion side in and emulsion side out, respectively, merely to illustrate that the present apparatus handles both with equal facility.

Mounted beneath the bottom panel 26 in a position adjacent to and rearwardly of the slot 96 is a stationary shear plate 114 which is arranged to cooperate with a cutting blade 116 of any suitable material, such as cutlery steel or the like. The cutting blade is preferably provided with a tapered cutting edge 118 of the self-sharpening type which is canted with respect to the forward longitudinal edge of the shear plate 114 and is mounted for movement from a normally inoperative position covering the slot in light excluding relation thereto to a forward dispensing position wherein the slot is uncovered to permit film to issue therethrough and then from such dispensing position back into its inoperative position to sever the length of the film fed through the slot.

To this end, a mounting plate 120 is fixedly secured to each end of the cutting blade, the forward end of each mounting plate being pivotally connected to the lower end of an inverted L-shaped arm 122, the opposite end of which is pivoted, as at 124, to the associated side panel of the housing. The rearward end of each mounting plate 120 has one end of a coil spring 126 connected therewith, the opposite end of which is connected with a suitable bracket 128 fixed to the associated side panel. It can be seen that the coil spring 126 serves to resiliently urge the cutting edge of the cutting blade into cooperating relation with the shear plate during the pivotal movement of the L-shaped arms 122 and, in addition, to resiliently urge the cutting blade into its normal, inoperative slot closing position.

The cutting blade is moved from its inoperative position to its dispensing position by means of a horizontally extending handle bar 130 disposed above the top panel of the housing and forming a bail with a pair of rigid arms 132 extending downwardly from opposite ends thereof. The lower end of each arm 132 is pivoted, as at 134, to the associated side panel of the housing and a connecting link 136 is pivotally interconnected between each arm at a position spaced above the pivot 134 and the associated blade mounting arm 122 at a generally horizontally aligned position. It can be seen that the handle bail is thus movable with the cutting blade, the arrangement being such that a mechanical advantage is gained. Preferably, a spring pressed detent 137 of conventional construction is mounted on the housing in a position to engage behind the rear edge of the right hand arm 132 adjacent its upper end to yieldingly retain the same in its dispensing position against the action of springs 126.

The apparatus 10 of the present invention includes a dispensing roller driving mechanism, generally indicated at 138, which is operable in response to the movement of the handle bar 130 from its normal rearwardly disposed position to its forwardly disposed position wherein the cutting blade is moved from its slot covering position to its dispensing position, to effect a rotary movement of a selected one of the dispensing rollers 92 and 94 of a selected amount to thereby feed a desired length of the desired film through the slot 96 to be cut off upon release of the handle bar. As best shown in FIGURES 5-7, the driving mechanism 138 includes an electric motor 140 or the like adapted to be actuated by an on-off microswitch 142 which, in turn, is positioned in the path of travel of the handle bar bail, specifically the right hand arm thereof as shown in FIGURES 6 and 7, to be actuated when the handle bar is moved into its forward position. The motor 140 is suitably mounted in the control chamber and includes a drive shaft 144 which extends through the right hand side panel 22 into the film chamber at a position spaced above the dispensing roller shaft 90. The inwardly extending end of the motor shaft 144 has a spur gear 146 suitably fixed thereto which is arranged to mesh with a cooperating spur gear 148 fixed to the shaft 90 in the same plane. Fixed to the motor drive shaft 144 within the control chamber 16 is a second spur gear 150 which meshes with a cooperating spur gear 152 suitably fixed on a horizontally spaced parallel driven shaft 154 suitably mounted within the control chamber and extending into the film chamber in substantially coextensive relation with respect to the drive shaft 144. The inwardly extending end of the driven shaft has a second spur gear 156 suitably fixed thereto which is disposed in a plane offset from the plane of the gear 146 and arranged to mesh with a cooperating spur gear 158 suitably fixed to the dispensing roller shaft 88 in the same plane.

It can be seen that when the dispensing roller assembly lever 78 is disposed in its up position, the roller assembly will be disposed in a position wherein cooperating gears 156 and 158 are in meshing engagement and cooperating gears 146 and 148 are out of meshing engagement thus enabling the dispensing roller 92 to be driven in response to the actuation of the motor 140. Conversely, when the lever is in a down position, gears 156 and 158 are out of mesh with each other and gears 146 and 148 are in meshing engagement to enable the dispensing roller 94 to be driven by the motor.

Since one or the other of the dispensing rollers is directly connected with the motor as determined by the position of the lever 78, the length of film fed through the slot 96 is dependent upon the length of time the motor is actuated. As previously indicated, the motor is initially actuated when the handle bar 130 is moved forward to uncover the slot 96 by the cutting blade. The motor is deactuated by means of a length selecting mechanism, generally indicated at 160, which will now be described.

Referring now more particularly to FIGURES 5-12, the mechanism 160 includes a rotary selector knob 162 disposed on the outer surface of the control panel 30 in cooperating relation to a compass-like dial plate 164 suitably calibrated in inches and fixed to the control panel. The selector knob 162 is suitably fixed to one end of a shaft 166 which extends through the control panel into the chamber 16 and is suitably supported therein, as by a U-shaped mounting bracket 168. Preferably, a suitable holding device is provided on the shaft 166 to positively retain the selector knob in positions corresponding to the calibrations of the dial plate. As shown, a gear-like element 170 is suitably fixed to the shaft 166 adjacent the inside surface of the control panel, the periphery of the element having a number of serrations or teeth formed therein corresponding to the indications of the dial plate. Slidably mounted adjacent the inside surface of the control panel in cooperating relation with the element 170 is a locking pin 171 of any appropriate construction having its lower end arranged to enter the peripheral serrations of the gear-like element and its upper end extending out of the housing and provided with a knob 172. A spring 173 acting between the pin and the housing serves to resiliently urge the lower end of the pin into engagement with the serrations or teeth of the element 170.

Mounted on the inwardly extending end of the shaft 166 for longitudinal and rotary movement with respect thereto is a sprocket wheel 174 having its periphery formed to receive an endless ball chain 176. As best shown in FIGURES 5-7, the ball chain 176 is trained about the sprocket wheel 174, an offset idler sprocket wheel 178, and a drive sprocket wheel 180 fixed to the driven shaft 154 so that the sprocket wheel 174 will be rotated about the shaft 166 in response to the actuation of the motor 140.

The sprocket wheel 174 has integrally formed on the outer side thereof a serrated annular clutch element 182 which is spring urged, as by a coil spring 184 positioned between the mounting bracket 168 and a flanged fork receiving portion 186 extending from the inner side of the sprocket wheel, into engagement with a cooperating clutch disk 188. The clutch disk 188 is preferably made of a resilient material, such as rubber or the like and is fixed to a disk plate 190 having an L-shaped arm 192 extending therefrom. The arm 192 is spring urged into engagement with an abutment 194 suitably fixed to the mounting bracket in the path of movement of the arm 192 by means of a spiral torsion spring 196 having its inner end fixed to a hub portion 198 extending from the disk plate and its outer end fixed to the abutment 194.

It will be seen that with the clutch elements 182 and 188 in their spring urged engaged position actuation of the motor 140 will cause the arm 192 to move away from its engaged position with the abutment 194 and this movement of the arm is utilized to effect the deactuation of the motor at a desired time or rotational interval as determined by the setting of the selector knob 162. To this end, a motor deactuating microswitch 200 is carried by the outer end of an arm 202 in a position within the path of movement of the arm 192, the arm 202 being suitably fixed to the shaft, as by a hub portion 204 or the like provided with a set screw or other appropriate shaft securing element.

The clutch elements 182 and 188 are maintained out of their spring urged engaged position when the handle bar is disposed in its rearward, cutting blade-closing-slot position and permitted to move into such position in response to the movement of the handle bar into its forward position by means of a fork lever 206 having a bifurcated end straddling the flanged portion 186 of the sprocket wheel 174. The fork lever 206 is suitably pivoted intermediate its end on the mounting bracket 168, as indicated at 208, and has its opposite end arranged to be abutted by the offset upper end of a lever arm 210, the lower end of which is suitably fixed to the right hand blade mounting arm 122 for movement therewith about the pivot 124. Preferably, the upper end of the lever arm 210 has a bolt 212 threaded therein for engaging the fork lever so that appropriate adjustments can be made when necessary or desired.

The coil spring 126 is of a strength sufficient to overcome the force of the coil spring 184 so that the fork lever 206 will normally be disposed in the position shown in FIGURE 8 with the clutch elements 182 and 188 out of engagement when the handle bar 130 is in its rearward inoperative position. In this position, the lever arm 210 retains the fork lever in a position compressing spring 184, the lever arm being movable with bolt 212 on the lever arm in a clockwise direction as viewed in FIGURE 8 in response to the movement of the handle bar into its forward position. In normal operation, the clutch elements are moved from their engaged position to their disengaged position in response to the release of the handle bar for movement under the action of spring 126 from its forward position to its rearward position. This action normally would complete a cycle of operation in which the length of film fed through the opening would be cut off by the cutting blade 116. In order to permit the driving mechanism to be reactuated to advance an additional length of film prior to the cutting operation, there is provided a re-set knob 214 which is disposed on the control panel 30 in a position adjacent the control knob 162. The re-set knob 214 has one end of a rod 216 connected therewith which rod extends into the control chamber 16 and has its opposite end bent upwardly and pivotally interconnected with the bolt end of the fork lever 206, as indicated at 218. It can be seen that because of the one-way action between the lever arm 210 and the fork lever 206, the latter can be pivoted from the position shown in FIGURE 11 to the position shown in FIGURE 12 by pulling the re-set knob 214.

Figure 13:
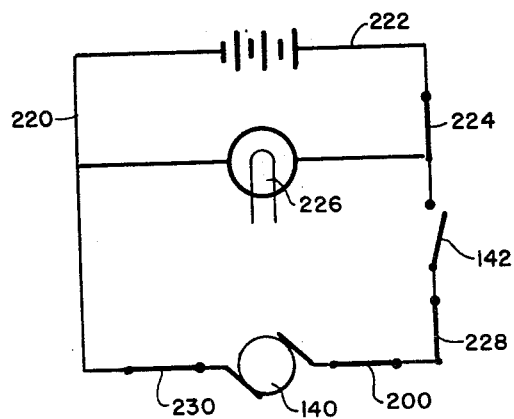
FIGURE 13 is a diagrammatical view showing the electrical circuit of the apparatus.

Referring now more particularly to FIGURE 13, there is shown therein a wiring diagram of the control circuit for the electric motor 140. The circuit includes a pair of main lines 220 and 222 suitably connected to a source of electrical energy. The line 222 has connected in series therein a main power off-on switch 224 as, for example, a conventional snap switch or the like, suitably mounted on the control panel. Preferably, a pilot light 226 is connected in parallel between the lines 220 and 222 so as to be energized when the switch 224 is closed to thereby provide a control panel mounted visual indication or signal to the operator that the main power source of the apparatus is properly connected.

The motor 140 is connected across the lines 220 and 222 in series with the starting microswitch 142, a safety selector switch 228, the stopping microswitch 200, and a multiple feed switch 230. As previously indicated, the starting microswitch 142 is preferably of the normally open type arranged to be closed when actuated. As best shown in FIGURES 6 and 7, the microswitch 142 is disposed in the path of movement of the right hand handle bar arm 132 so as to be engaged and thus closed when the handle bar is moved into its forward position. The selector switch 228 is provided merely as a safety feature and is operatively associated with the lever 78 so as to be closed when the lever is disposed in either of its operative position and opened in the event that such lever is disposed out of either of its operative positions. The microswitch 200 is of the normally closed type arranged to be moved into an open position by engagement of the arm 192 therewith to open the same. The multiple feed switch 230 is preferably of the conventional off-on snap type similar to the main power switch 224 and is mounted on the control panel in a position adjacent thereto.

Operation

The flange assemblies 44 are longitudinally adjustable, as by thumb screws 48, on the shafts 32, so as to rotatably support film rolls of any desired width within a given range, as, for example, rolls having a width of from 6 inches to 30 inches. As shown, the roll R has a width of 20 inches while the roll R' has a width of 14 inches. It will also be noted that the drive rollers and idler roller assemblies are correspondingly longitudinally adjustable so as to accommodate rolls of different widths. The rolls are maintained in a position so that the side thereof opposite from the emulsion side will engage the driven rollers 92 and 94. The idler roller assemblies are longitudinally adjusted in the manner previously indicated so that the idler rollers 108 and 112 will engage the emulsion side of the film at positions adjacent the marginal edges thereof. The idler rollers thus serve to resiliently urge the associated film into driving contact with the associated driven roller.

In the inoperative position of the apparatus, cutting blade 116 is maintained in the position shown in FIGURE 2 covering the dispensing slot 96, by the resilient action of the coil springs 126 and, as best shown in FIGURE 5, the handle bar 130 is disposed in its rearward position corresponding to the slot closing position of the cutting blade. To commence operation, the main power switch 224 is closed which lights the pilot light 226 indicating that the apparatus is in condition to be operated. Next, the selector lever 78 is checked to determine if it is in proper position suitable to permit the driving mechanism 138 to advance film from the selected roll R or R', depending upon the width desired. As previously indicated, when the lever 78 is disposed in its downward operative position, the driving mechanism 138 is effective, upon actuation, to drive the driven roller 92 through meshing engagement of the cooperating gears 156 and 158. In a like manner, when the lever 78 is disposed in its upper position, the driving mechanism 138 will be effective, upon actuation, to rotate the driven roller 94 through meshing engagement of the gears 146 and 148.

Figure 9:
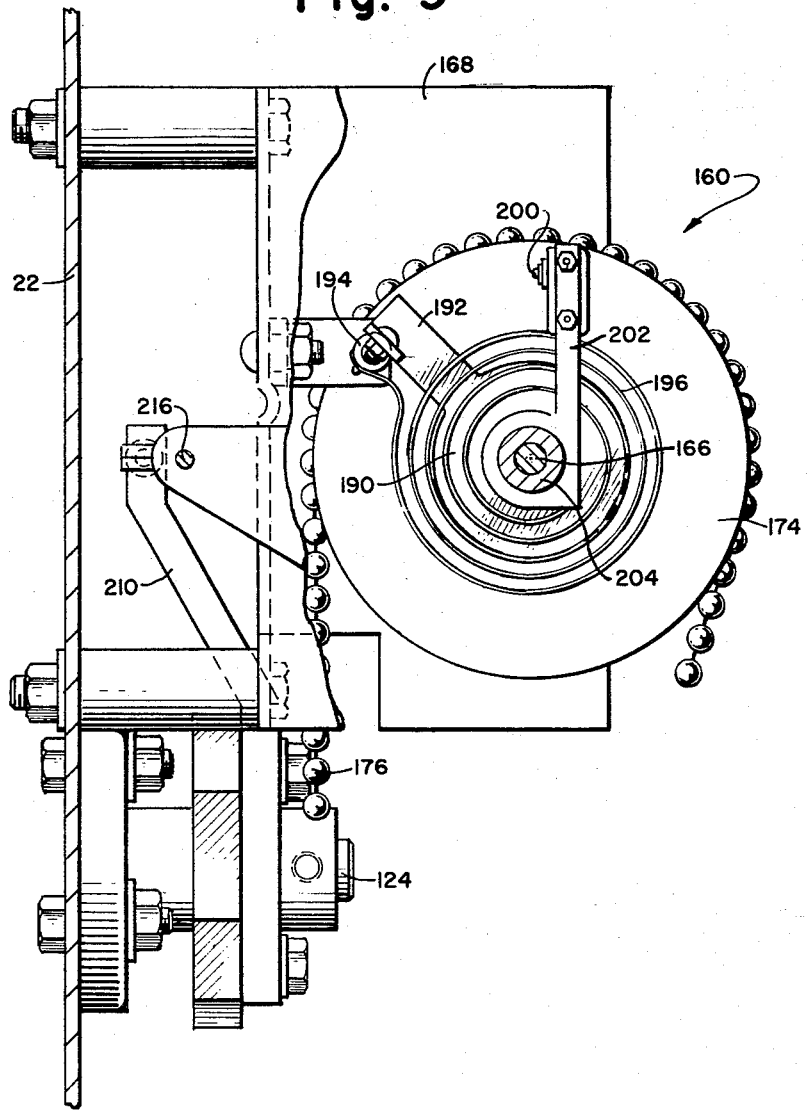
FIGURE 9 is a cross-sectional view taken along the line 9—9 of FIGURE 8.

With the lever 78 disposed in proper position, locking pin knob 172 is pulled up to disengage the pin end from the teeth of element 170 and the length selector knob 162 is then rotated until the indicator thereof points to the calibration on the dial plate corresponding to the length of film which is desired. The calibrations of the dial are such that any length within a given range in predetermined increments can be obtained. For example, lengths of one inch to 36 inches in one-inch increments. It will be noted that the turning of the knob 162 serves to position the arm 202 carrying the microswitch 200 a corresponding spaced distance from the arm 192, as is best shown in FIGURE 9. As previously indicated the arm 192 is normally maintained in its starting position in engagement with the abutment 194 by the action of torsion spring 196. Moreover, the clutch elements 182 and 188 are normally maintained out of engagement in the position shown in FIGURE 8 through the engagement of the lever arm bolt 212 with the fork lever 206. Again, it will be noted that, when the apparatus is in its normal inoperative position, the main coil springs 126 are of a sufficient strength to maintain the handle bar 130 in its rearward position, the cutting blade 116 in its slot covering position, and the fork lever 206 in the position shown in FIGURE 8 wherein the clutch spring 184 is compressed.

After the selector knob 162 has been turned to the desired position the holding pin knob 172 is released and the handle bar 130 is gripped by the operator and moved from its rearward position as shown in FIGURE 5 to its forward position as shown in FIGURE 6 where it is yieldingly retained by the detent 137. As previously indicated, the starting microswitch 142 is closed in response to the movement of the handle bar 130 into its forward position, thus completing the circuit to the motor 140 through the closed selector switch 228, the normally closed stopping microswitch 200 and the closed multiple feed switch 230. Thus, the motor 140 is energized to drive the selected driven roller 92 or 94 to advance the film in contact therewith in response to the movement of the handle bar into its forward position.

It will also be noted that the movement of the handle bar into its forward position serves to effect simultaneous movement of the cutting blade from its slot closing position, such as shown in FIGURE 5, to its dispensing position, such as shown in FIGURE 6, through the operation of the connecting links 136 and blade mounting arms 122. In the position shown in FIGURE 6, the dispensing slot 96 is open so that the film in driving contact with the roller being driven can be advanced therethrough in response to the rotation of the driven roller.

Figure 11:
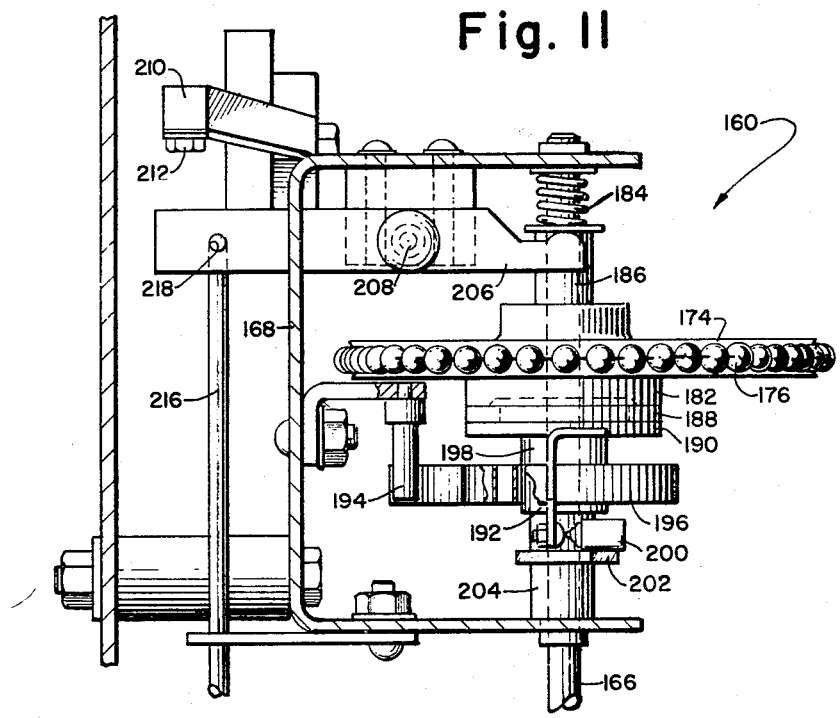
FIGURE 11 is a view similar to FIGURE 8 showing the parts in their operative position.
Figure 10:
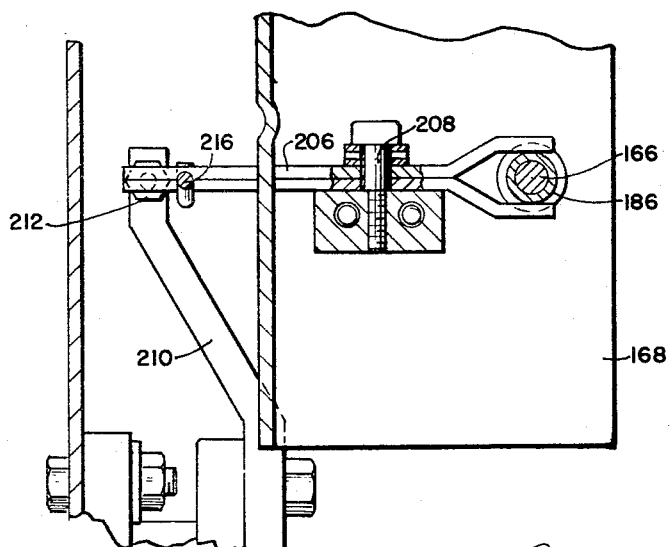
FIGURE 10 is a fragmentary sectional view taken along the line 10—10 of FIGURE 8.
Figure 12:
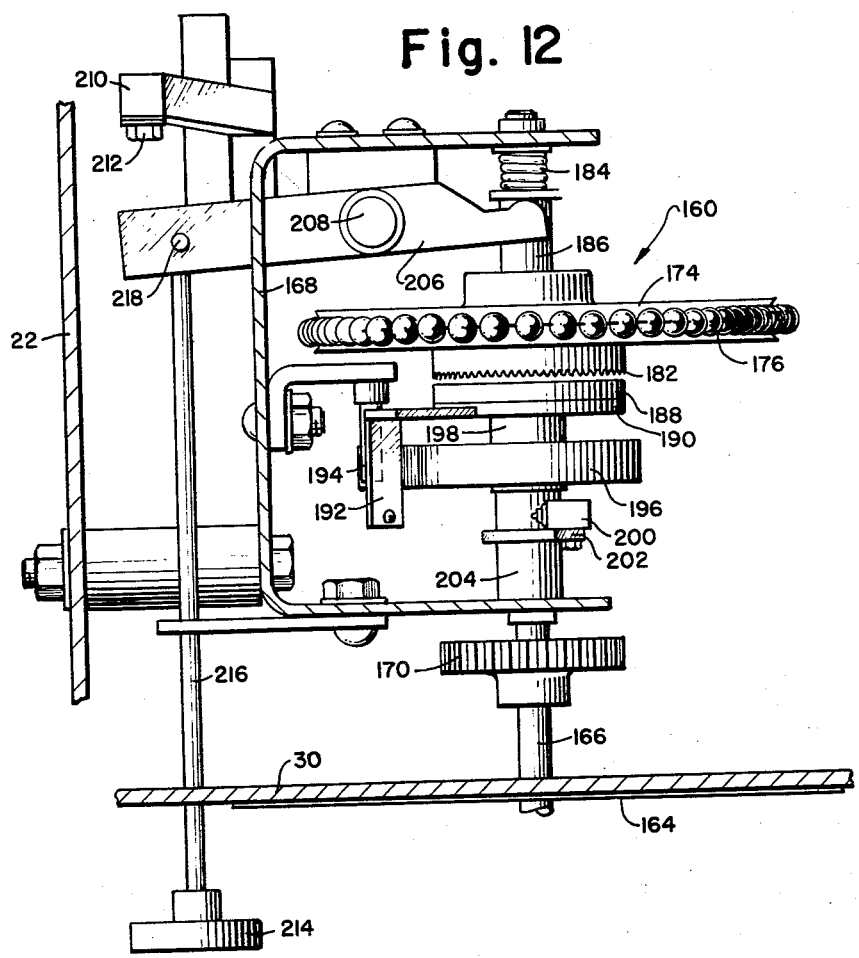
FIGURE 12 is a view similar to FIGURE 8 showing the parts in their reset position.

It will also be noted that the length selecting mechanism 160 will be moved from the position shown in FIGURE 8 to the position shown in FIGURE 11 in response to the movement of the handle bar from its rearward to its forward position. Thus, by the movement of the lever arm bolt 212 away from engagement with the fork lever 206, clutch elements 182 and 188 on the sprocket wheel 174 and disk plate 190 respectively will be moved into engagement through the operation of the coil spring 184. Sprocket wheel 174 is also driven by the energized motor 140 through ball chain 176 and due to the engagement of the clutch elements 182 and 188, the arm 192 is moved with the sprocket wheel, such movement of the arm 192 being in direct proportion to the rotary movement of the film contacting roller being driven. The arm 192 will continue its movement until microswitch 200 is engaged to thereby de-energize the motor circuit and stop the advance of the film. In this way, the length selecting mechanism 160 is operable to de-actuate the driving mechanism 138 in response to a predetermined arcuate movement of the arm 192 which is a direct function of the rotational movement of the film contacting roller being driven.

If the length of film desired is within the size range adjustment of the knob 162, the handle bar 130 is then simply pushed by the operator after the motor 140 has been de-energized in the manner indicated above, to overcome the force of the detent 137 and permit the handle bar to move from the forward position, shown in FIGURE 6, back to its rearward position, shown in FIGURE 5, under the action of the coil springs 126. During this movement, the cutting blade 116 cooperates with the shear plate 114 to sever the desired length of film fed through the slot 96 from the roll.

It will be noted that, during the movement of the handle bar back to its rearward position, the starting microswitch 142 is disengaged and moved into its normally open position and the length selecting mechanism 160 is moved from the position shown in FIGURE 11 to the position shown in FIGURE 8. Thus, the bolt 212 on the arm 210 will engage the associated end of the fork lever and move the sprocket wheel 174 against the action of spring 184 to thus disengage the clutch elements 182 and 188. Disengagement of the clutch elements causes the arm 192 to return to its starting position in engagement with the abutment 194 under the action of the torsion spring 196. During this movement, the stopping microswitch 200 is disengaged and thus moved into its normally closed position. The apparatus is now in its normal inoperative position suitable to be re-cycled to advance and to cut additional lengths of film from either of the rolls of the desired width.

When it is desired to cut lengths of film from the rolls which are greater than the maximum length within the adjustment of the knob 162, the knob 162 is first set to a value of approximately half or to the nearest half length needed. The handle bar is then moved into its forward operative position to initiate the cycle of operation set forth above to advance, through the slot 96, a length of film of the desired width which corresponds in length to the setting of the dial. After the driving mechanism has been de-actuated by the stopping microswitch 200, the handle bar is held in its forward position and the multiple feed switch 230 is snapped into its open position. Next, the knob 162 is set to the balance of the film length desired. The re-set knob 214 is then pulled outwardly to move the length selecting mechanism 160 from the position shown in FIGURE 11 to the position shown in FIGURE 12.

It will be noted that, when the knob 214 is pulled, fork lever 206 will be pivoted to move the sprocket wheel 174 in a direction to compress the coil spring 184 and thus disengage the clutch elements 182 and 188. As previously indicated, the disengagement of the clutch elements 182 and 188 permits the arm 192 to move into its starting position in engagement with the abutment 194 under the action of the torsion spring 196. As before, this movement also serves to disengage the stopping microswitch 200 and move the same into its normally closed position. It will be noted, however, that, since the multiple switch 230 is open, motor 140 will not be energized by the closing of the microswitch 200, even though the starting switch 142 is closed. The motor circuit is now under the control of the multiple feed switch 230 and by closing the same, motor 140 can again be energized to actuate the drive mechanism 138 to rotate the selected film contacting roller to advance an additional length of film through the slot 96 as determined by the setting of the knob 162. As before, the motor 140 is de-energized to de-actuate the driving mechanism in response to the engagement of the arm 192 with the microswitch 200 to open the circuit. In this condition, the operator can then release the handle bar to permit the cutting blade to sever the length of film advanced and move the driving mechanism and length selecting mechanism back to their normal inoperative positions as shown in FIGURES 5 and 8.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:
1. Apparatus for cutting lengths of film from a roll of film comprising: a substantially light excluding housing having a film dispensing slot therein; means in said housing for rotatably supporting a roll of film; a driven roller in said housing movingly engaging the film from said roll for advancing a length of such film through said slot; a fixed elongated rail mounted in said housing in parallel relation to the axis of said driven roller; a mounting bracket longitudinally slidable on said rail; a first arm pivoted to said bracket for movement about an axis parallel to the axis of said driven roller; a first idler roller journalled on said first arm for rotation about an axis parallel to the axis of said driven roller and engageable with the marginal edges of the film which is in contact with the periphery of said driven roller; a second arm pivoted to said first arm; a second idler roller journalled on said second arm and engageable with the marginal edges of the film which is in contact with the periphery of said driven roller; first spring means between said first arm and said bracket; second spring means between said first and second arms, said first and second spring means resiliently biasing said idler rollers toward said driven roller; a cutting blade movable from a normal position covering said slot to a dispensing position permitting a length of film to be advanced through said slot and from said dispensing position back into said normal position to cut off the length of film advanced through said slot; and means for moving said film advancing means when said blade is disposed in said dispensing position.

2. Apparatus as defined in claim 1 wherein said housing has disposed therein means for rotatably supporting a second roll of film and means movingly engaging the film from the second roll for advancing a length of such film through said slot.

3. Apparatus as defined in claim 2 wherein means is provided for operatively connecting said means for moving the film advancing means selectively with the film advancing means for said first mentioned film roll as the film advancing means for said second film roll.

4. Apparatus for advancing lengths of film from a roll comprising a housing, a driven roller rotatably mounted in said housing for engaging film from a roll, an elongated rail mounted in said housing in substantially coextensive parallel relation to said roller, a pair of mounting brackets slidably mounted on said rail, an arm pivoted to each mounting bracket, an idler roller rotatably mounted on each arm, and spring means between each mounting bracket and associated arm for resiliently urging the associated idler roller toward the periphery of said driven roller; a second arm pivotally mounted on each of said first mentioned arms; a second idler roller on each second arm; and second spring means between each pair of pivotally interconnected arms resiliently biasing the rollers carried thereby toward each other.

5. Apparatus as defined in claim 4 including means in said housing for rotatably supporting the roll of film drivingly contacting said driven roller, said means comprising a shaft movably journaled in said housing, a pair of flange assemblies longitudinally adjustably mounted on said shaft for engaging the ends of a roll of film having said shaft extending therethrough and means for yieldingly restraining rotation of said shaft with the film roll mounted therein, at least one of said flange assemblies comprising an annular member slidably mounted on said shaft and having means thereon for fixing the same in different positions of longitudinal adjustment on said shaft, said member having an inwardly tapering frusto conical surface thereon, a flange ring mounted on said annular member in surrounding relation to said frusto conical surface for longitudinal movement toward and away from the inner end thereof, and spring means resiliently urging said flange ring toward the inner end of said frusto conical surface.

6. Apparatus for selectively advancing sheet material from rolls comprising a pair of spaced parallel driven rollers, means for biasing sheet material from a first roll into driving contact with one of said rollers, means for biasing sheet material from a second roll into driving contact with the other of said rollers, means mounting said rollers for pivotal movement together about an axis parallel to the axes of rotation thereof into two operative positions, driving means mounted in fixed position with respect to said pivotal axis, means for drivingly connecting one of said rollers with said driving means in response to the pivotal movement of said rollers together into one of said operative positions, and means for drivingly connecting the other of said rollers with said driving means in response to the pivotal movement of said rollers together into the other of said operative positions.

7. Apparatus as defined in claim 6 wherein said driving means comprises a pair of parallel shafts having a pair of meshing gears thereon, said first mentioned drivingly connecting means comprises a third gear on one of said shafts and a mating fourth gear fixed with respect to said one roller, and said last mentioned drivingly connecting means comprises a fifth gear fixed on the other of said shafts and a mating sixth gear fixed with respect to said other roller.

8. Apparatus for driving a feed roller for sheet material to advance selected lengths of such material from a roll thereof comprising an electric motor for driving connection with the feed roller to rotate the same in response to the energization of said motor, means for energizing said motor, a shaft; an arm rotatably mounted on said shaft for biased movement into a starting position and movable away from such position through a predetermined path, an arm fixed to said shaft and extending outwardly thereof for movement within said path into different positions of fixed adjustment spaced away from said starting position, a switch carried by one of said arms for engagement by the other of said arms when said members are moved relatively together in said path, said switch being operatively connected with said motor to de-energize the latter when engaged by said other arm, a driven wheel rotatably and slidably mounted on said shaft, and clutch means for detachably drivingly connecting said wheel with said rotatable arm so as to effect movement of the latter from said starting position through said path to a position adjacent said fixed arm to thereby engage said switch and de-energize said motor.

9. Apparatus as defined in claim 8 including a fixed abutment, a spiral torsion spring between said rotatable arm and said abutment resiliently urging said rotatable arm against said abutment to dispose the latter in said starting position.

10. Apparatus as defined in claim 9 including spring means for resiliently biasing said wheel toward said rotatable arm to engage said clutch elements and a pivoted lever for moving said wheel away from said rotatable arm.

11. Apparatus as defined in claim 10 wherein said motor energizing means includes a starting switch engageable to energize said motor and motion transmitting means movable from an inoperative position to an operative position to engage said starting switch, said motion transmitting means being operatively connected with said lever to normally maintain the same in a clutch element disengaging position when said motion transmitting means is in its inoperative position and to move said lever to a clutch element engaging position in response to the movement of said motion transmitting means into its operative position.

12. Apparatus as defined in claim 11 including separate means for moving said lever from said clutch engaging position to said clutch disengaging position while said motion transmitting means is disposed in its operative position; and a manual starting switch for energizing said motor after said separate means has been operated.

13. Apparatus for cutting varying lengths of film from a plurality of rolls of film of different widths comprising a substantially light-excluding housing having a film dispensing slot therein, means in said housing for supporting a first roll of film for rotary movement, means in said housing for supporting a second roll of film for rotary movement, said film roll supporting means being longitudinally adjustable to accommodate rolls of varying width, a pair of spaced parallel driven rollers mounted in said housing, longitudinally adjustable idler roller means engaging the film from the first roll adjacent the marginal edges thereof for biasing the opposite side thereof into driving engagement with one of said driven rollers, longitudinally adjustable idler roller means engaging the film from the second roll adjacent the marginal edges thereof for biasing the opposite side thereof into driving engagement with the other of said driven rollers, means mounting said driven rollers within said housing for pivotal movement together about an axis parallel to the axes of rotation thereof into two operative positions, motor operated driving means mounted in fixed position with respect to said pivotal axis, means for drivingly connecting one of said driven rollers with said driving means in response to the pivotal movement of said rollers together into one of said operative positions, means for drivingly connecting the other of said rollers with said driving means in response to the pivotal movement of said rollers together into the other of said operative positions, means for selectively pivoting said rollers into said operative positions, a cutting blade movable from a normal position covering said slot to a dispensing position permitting a length of film from one of said film rolls to be advanced through said slot and from said dispensing position back into said normal position to cut off the length of film advanced through said slot, means operable in response to the movement of said blade into said dispensing position for actuating said driving means, means for deactuating said driving means in response to a predetermined rotary movement of the roller driven by said driving means, and means for varying the predetermined rotational movement of the driven roller to which said deactuating means is responsive.

14. Apparatus as defined in claim 13 wherein said last-mentioned means comprises a shaft, a first arm rotatably mounted on said shaft, a second arm fixed to said shaft, a fixed abutment, a spiral torsion spring between said rotatable arm and said abutment resiliently urging said rotatable arm against said abutment, a wheel drivingly connected to said driving means and rotatably and slidably mounted on said shaft, clutch elements carried by said rotatable arm and said wheel cooperatively engageable in response to longitudinal sliding movement of said wheel toward said rotatable arm, spring means for resiliently biasing said wheel toward said rotatable arm to engage said clutch elements, a pivoted fork lever for moving said wheel away from said rotatable arm, said rotatable arm being movable in response to the driven movement of said wheel by said driving means with said clutch elements in engagement from its limiting position to a position adjacent said fixed arm, means for retaining said shaft in different positions of rotational adjustment so as to dispose the arm fixed thereon in varying spaced positions from the rotatable arm when the latter is disposed in its limiting position, said driving means including an electric motor, said deactuating means including a switch carried by one of said arms for interrupting the circuit to said motor when said arms are moved into a position adjacent each other.

15. Apparatus as defined in claim 14 wherein said means for actuating said driving means includes a starting switch for energizing said motor, motion transmitting means operatively connected with said cutting blade for movement therewith from an inoperative position to an operative position to engage said starting switch in response to the movement of said cutting blade from said inoperative position to said dispensing position, said motion transmitting means being operatively connected with said fork lever to normally maintain the same in a clutch element disengaging position when said motion transmitting means is in its inoperative position and to move said fork lever to a clutch element engaging position in response to the movement of said motion transmitting means into its operative position.

16. Apparatus as defined in claim 15 wherein said motion transmitting means includes a pivoted handle bar of generally inverted U-shaped construction resiliently biased to maintain said motion transmitting means and said cutting blade in their inoperative positions.

17. Apparatus as defined in claim 15 including separate means for moving said fork lever from said clutch element engaging position to said clutch element disengaging position while said motion transmitting means is disposed in its operative position, and a manual starting switch for energizing said motor after said separate means has been operated.

References Cited in the file of this patent

UNITED STATES PATENTS

| | | |
|---|---|---|
| 417,133 | Barrett | Dec. 10, 1889 |
| 1,789,688 | Rast et al. | Jan. 20, 1931 |
| 1,870,800 | Elder | Aug. 9, 1932 |
| 2,246,456 | Quigley | June 17, 1941 |
| 2,531,376 | Langdon | Nov. 21, 1950 |
| 2,622,681 | Durst | Dec. 23, 1952 |
| 2,637,561 | Connell | May 5, 1953 |
| 2,720,994 | Arvidson | Oct. 18, 1955 |
| 2,748,861 | Von Stoeser | June 5, 1956 |
| 2,858,130 | Baur et al. | Oct. 28, 1958 |